US011275172B2

United States Patent
Kitamura

(10) Patent No.: US 11,275,172 B2
(45) Date of Patent: Mar. 15, 2022

(54) TARGET DETECTION DEVICE

(71) Applicant: DENSO CORPORATION, Kariya (JP)

(72) Inventor: Takayuki Kitamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 161 days.

(21) Appl. No.: 16/084,821

(22) PCT Filed: Mar. 15, 2017

(86) PCT No.: PCT/JP2017/010436
§ 371 (c)(1),
(2) Date: Sep. 13, 2018

(87) PCT Pub. No.: WO2017/159735
PCT Pub. Date: Sep. 21, 2017

(65) Prior Publication Data
US 2019/0079179 A1 Mar. 14, 2019

(30) Foreign Application Priority Data

Mar. 16, 2016 (JP) .............................. JP2016-052828

(51) Int. Cl.
G01S 13/93 (2020.01)
G01S 13/34 (2006.01)
G01S 13/931 (2020.01)
G01S 13/58 (2006.01)
G01S 13/42 (2006.01)
G01S 7/02 (2006.01)
G01S 13/08 (2006.01)

(52) U.S. Cl.
CPC ................ *G01S 13/93* (2013.01); *G01S 7/02* (2013.01); *G01S 13/08* (2013.01); *G01S 13/34* (2013.01); *G01S 13/42* (2013.01); *G01S 13/583* (2013.01); *G01S 13/931* (2013.01)

(58) Field of Classification Search
CPC ............. G01S 13/93; G01S 7/02; G01S 13/08
See application file for complete search history.

(56) References Cited

U.S. PATENT DOCUMENTS

| 5,194,870 A * | 3/1993 | Pearce | G01S 13/34 342/128 |
| 5,652,589 A * | 7/1997 | Ono | G01S 13/345 342/70 |
| 6,549,762 B1 * | 4/2003 | Hirabe | H04B 7/0854 342/378 |

(Continued)

FOREIGN PATENT DOCUMENTS

| JP | H11271430 | 10/1999 |
| JP | 2002-131420 A | 5/2002 |

(Continued)

*Primary Examiner* — Thomas Ingram
*Assistant Examiner* — Omar K Morsy
(74) *Attorney, Agent, or Firm* — Maschoff Brennan

(57) ABSTRACT

A target detection device includes an analysis section, a direction estimating section, a received waveform forming section, and a distance calculating section. The received waveform forming section forms a received waveform for each of the frequencies of the continuous waves by weighting beat signals corresponding to received waves received by each of receiving antennas, so as to have directivity in one of arrival directions estimated by the direction estimating section.

5 Claims, 12 Drawing Sheets

(56) References Cited

U.S. PATENT DOCUMENTS

| | | | | |
|---|---|---|---|---|
| 6,573,859 | B2* | 6/2003 | Tokoro | G01S 13/931 |
| | | | | 342/70 |
| 7,006,042 | B2* | 2/2006 | Tong | H04B 7/0848 |
| | | | | 342/377 |
| 7,567,204 | B2* | 7/2009 | Sakamoto | G01S 7/354 |
| | | | | 342/118 |
| 2007/0023520 | A1 | 2/2007 | Miyashita | |
| 2009/0267822 | A1 | 10/2009 | Shinoda et al. | |
| 2010/0019950 | A1 | 1/2010 | Yamano et al. | |
| 2012/0194377 | A1* | 8/2012 | Yukumatsu | G01S 7/35 |
| | | | | 342/70 |
| 2014/0028493 | A1* | 1/2014 | Izumi | G01S 13/4454 |
| | | | | 342/149 |
| 2016/0009283 | A1 | 1/2016 | Tokimasa et al. | |
| 2016/0018219 | A1 | 1/2016 | Sakamoto et al. | |
| 2016/0104946 | A1 | 4/2016 | Natsume | |
| 2017/0176593 | A1 | 6/2017 | Satou et al. | |

FOREIGN PATENT DOCUMENTS

| | | |
|---|---|---|
| JP | 2009-036514 A | 2/2009 |
| JP | 2009-265007 A | 11/2009 |
| JP | 2010-122024 A | 6/2010 |
| JP | 2014/169923 | 9/2014 |
| JP | 2015-175700 A | 10/2015 |
| JP | 2015-190777 A | 11/2015 |

* cited by examiner

MUSIC

TARGET DETECTION DEVICE

CROSS-REFERENCE TO RELATED APPLICATION

This application is a national stage application under 35 U.S.C. § 371(c) of PCT Application No. PCT/JP2017/010436, filed on Mar. 15, 2017, which is based on and claims the benefit of priority from earlier Japanese Patent Application No. 2016-052828, filed on Mar. 16, 2016, the description of which is incorporated herein by reference.

TECHNICAL FIELD

The present disclosure relates to a target detection device for detecting a target around a vehicle.

BACKGROUND ART

Radar systems include a multi-frequency CW system in which continuous waves each having a fixed frequency are transmitted for a plurality of transmission frequencies. Generally, the multi-frequency CW system generates, for each transmission frequency, a beat signal from transmitted waves, and received waves that is the transmitted waves reflected by the target and then received. As such a multi-frequency CW radar, a radar is known that frequency-analyzes a beat signal generated for each transmission frequency to detect a relative speed of a target from frequency components of the beat signal, and to detect a distance to the target from a phase of the beat signal (for example, PTL 1 described below).

CITATION LIST

Patent Literature

[PTL 1] JP 2015-190777 A

SUMMARY OF THE INVENTION

A frequency of the beat signal of the above multi-frequency CW radar is a frequency corresponding to a relative speed of the target that reflected the transmitted waves. A phase at the frequency is a phase corresponding to a distance to the target. However, if the received waves include reflected waves from a plurality of targets having the same relative speed, frequency components of the beat signal based on the received waves correspond to one frequency for a plurality of targets. This is why the phase in the frequency cannot be detected by separating the phase for each target. As a result of detailed examination by the inventor, a problem has found that if a plurality of targets having the same relative speed are present around the radar, it is difficult to obtain a distance to each target with high accuracy.

In one aspect of the present disclosure, even if a plurality of targets having the same relative speed are present around the radar, it is desirable to be able to provide a target detection device capable of calculating a distance to each target with high accuracy.

An aspect of the present disclosure is a target detection device that detects a target around a vehicle, and which includes an analysis section, a direction estimating section, a received waveform forming section, and a distance calculating section. The analysis section frequency-analyzes each of beat signals generated from a plurality of continuous-wave signals having different frequencies sequentially transmitted by an on-vehicle radar having a plurality of receiving antennas and received waves which are continuous waves (continuous-wave signals) reflected by the target and received by each of the receiving antennas, for each of the frequencies of the continuous waves and for each of the receiving antennas. The direction estimating section estimates arrival directions of reflected waves for each frequency bin in which presence of the target is recognized by frequency analysis in the analysis section. The received waveform forming section forms a received waveform for each of the frequencies of the continuous waves by weighting the beat signals corresponding to the received waves received by each of the receiving antennas, so as to have a directivity in one of the arrival directions estimated by the direction estimating section. The distance calculating section calculates a distance to the target from a phase difference between the received waveforms formed by the received waveform forming section for each of the frequencies of the continuous waves.

According to the present disclosure, a received waveform which reduces reflected waves from targets which are in directions other than a direction the directivity of a receiving antenna is directed is formed by the received waveform forming section. Thus, even if a plurality of targets having the same relative speed are present, the phase of the received waveform that has been formed mainly includes the phase component corresponding to the distance to the target which is present in the direction the directivity is directed. Therefore, even if a plurality of targets having the same relative speed are present around the own vehicle, the distance to each target can be calculated with high accuracy.

References in parentheses described in claims indicate correspondence relation with specific means described in embodiments described below as one mode, and do not limit the technical scope of the present disclosure.

DESCRIPTION OF EMBODIMENTS

With reference to drawings, embodiments of the present disclosure will be described below.

(Overall Configuration)

Figure 1:
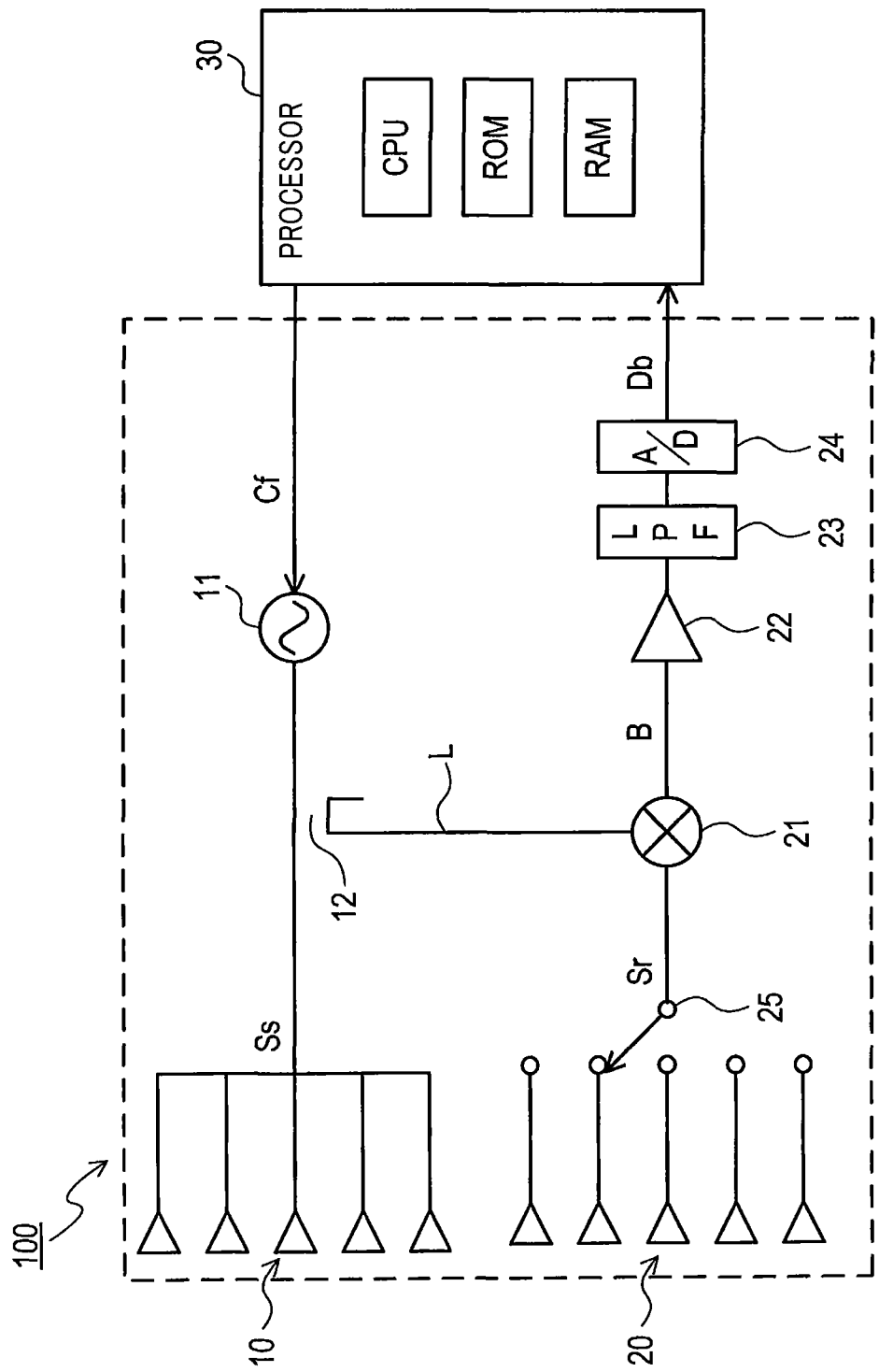
FIG. 1 is a block diagram showing an overall configuration of a radar device.

First, with reference to FIG. 1, a configuration of a radar device including a target detection device according to the present embodiment will be described. The radar device according to the present embodiment is a device that includes a pair of millimeter-wave radars 100 and a processor 30 and detects a target which is present around the vehicle. In the present embodiment, the processor 30 corresponds to a target detection device.

Figure 7:
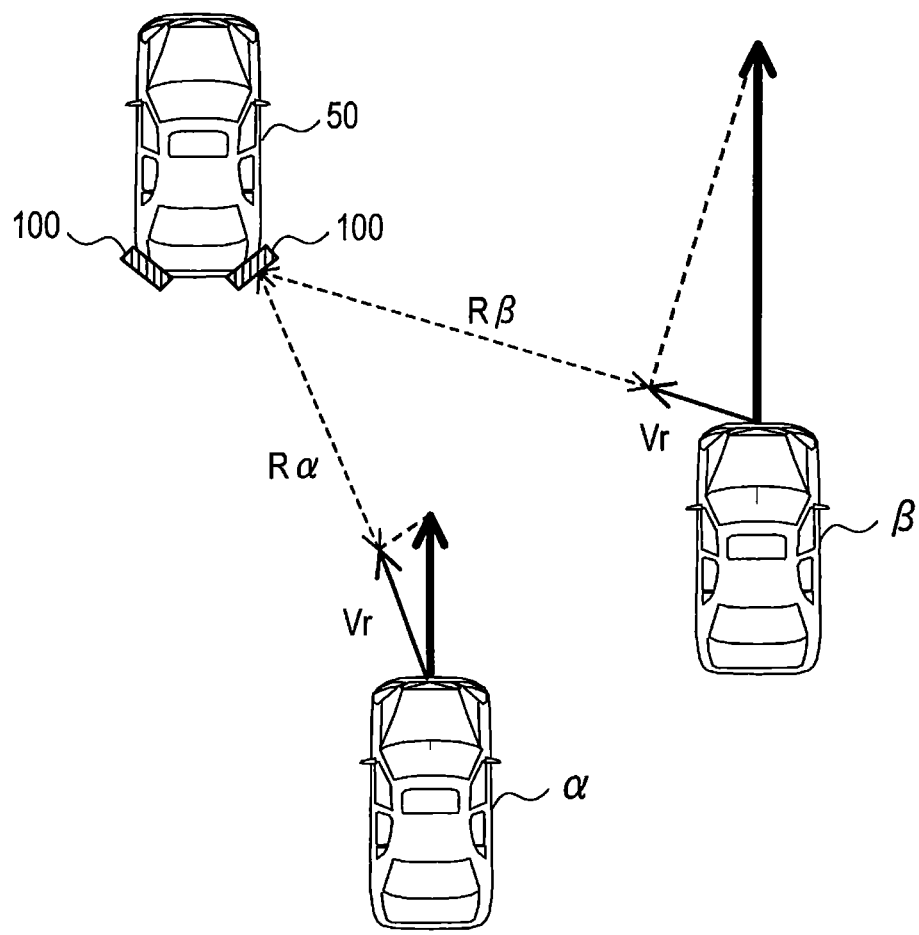
FIG. 7 is a diagram showing a plurality of targets traveling at the same relative speed around the vehicle.

As shown in FIG. 7, the pair of millimeter-wave radars 100 are provided on both the right and left ends of a bumper at the rear end of a vehicle 50, and set so that the region behind the vehicle 50 is to be a search region. Each of the millimeter-wave radars 100 includes an oscillator 11, a distributor 12, a transmission antenna section 10, a receiving antenna section 20, a receiving switch 25, a mixer 21, an amplifier 22, an LPF 23, and an A/D converter 24. Each of the millimeter-wave radars 100 operates as a 2-frequency CW radar using frequencies f1 and f2 as transmission frequencies. LPF is an abbreviation of Low Pass Filter, and A/D converter is an abbreviation of Analog-Digital converter. In the present embodiment, each of the millimeter-wave radars 100 corresponds to an in-vehicle radar.

The oscillator 11 is a so-called voltage-controlled oscillator with a PLL circuit, and generates a millimeter wave band signal having a frequency according to frequency control signal Cf generated by the processor 30. The frequency control signal Cf is a signal generated by the processor 30 to transmit radar waves of a predetermined frequency for a certain period of time. In the present embodiment, the oscillator 11 alternately receives two types of frequency control signal Cf to transmit radar waves of frequencies f1 and f2. A difference Δf between the frequency f1 and frequency f2 is a sufficiently small frequency compared with an intermediate frequency fc of the frequency f1 and frequency f2. PLL is an abbreviation of Phase Locked Loop, and CW is an abbreviation of Continuous Waves.

The distributor 12 distributes an output of the oscillator 11 to a transmission signal Ss and a local signal L, and supplies the transmission signal Ss to the transmission antenna section 10 and also supplies the local signal L to the mixer 21. The transmission antenna section 10 includes K antennas that transmit millimeter wave band radar waves and transmits the radar waves (transmitted waves) which are CW, toward behind the vehicle 50, according to the transmission signal Ss. K is an integer of 2 or more. Specifically, the transmission antenna section 10 alternately transmits radar waves Tw1 (transmitted waves Tw1) of the frequency f1 and radar waves Tw2 (transmitted waves Tw2) of the frequency f2 in time division.

Figure 2:
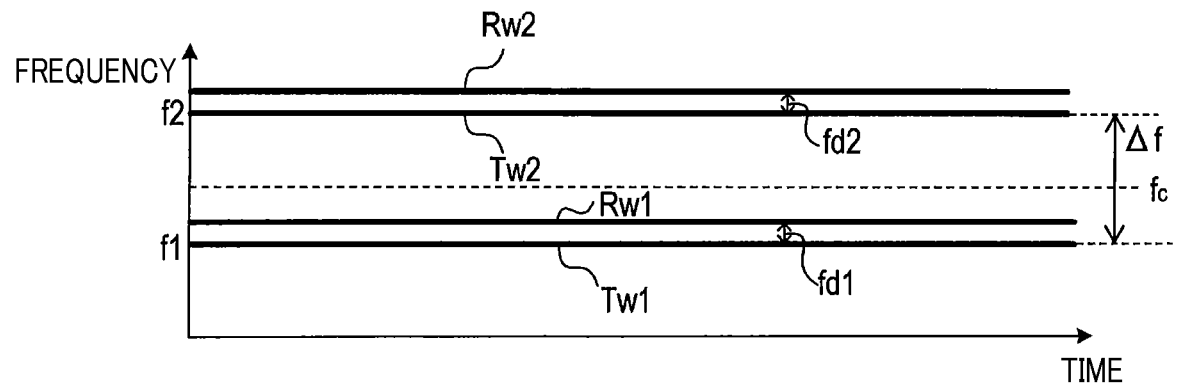
FIG. 2 is a diagram showing transmission frequencies and received frequencies of a 2-frequency CW radar.

The receiving antenna section 20 includes N antennas arranged in a row in a horizontal direction, and receives radar waves transmitted from the transmission antenna section 10 and then reflected by the target. Channels ch1 to chN are assigned to the N antennas, respectively. K is an integer of 2 or more. As shown in FIG. 2, a frequency of received waves Rw1 received by the receiving antenna section 20 is Doppler shifted from the frequency f1 to a frequency f1+fd1 according to the relative speed of the target. Similarly, a frequency of received waves Rw2 is Doppler shifted from the frequency f2 to a frequency f2+fd2. FIG. 2 shows Doppler shifts fd1 and fd2 corresponding to the relative speed when the vehicle 50 is close to the target.

The receiving switch 25 sequentially selects the antennas in the receiving antenna section 20 one by one and supplies a received signal Sr from the selected antenna to the mixer 21. The mixer 21 mixes the local signal L with the received signal Sr to generate a beat signal B and supplies the generated beat signal B to the amplifier 22. Specifically, the mixer 21 generates a beat signal B1 from signals of the transmitted waves Tw1 and the received waves Rw1. The mixer 21 also generates a beat signal B2 from signals of the transmitted waves Tw2 and the received waves Rw2. The beat signals B1 and B2 are collectively called the beat signal B. The amplifier 22 amplifies the beat signal B and supplies the beat signal B to the LPF 23.

With a sampling frequency in the A/D converter 24 set to fs, the LPF 23 removes a frequency component having frequencies of fs/2 or higher from the beat signal B amplified by the amplifier 22, and supplies the resultant signal to the A/D converter 24. The A/D converter 24 samples the output of the LPF 23 at the sampling frequency fs, and converts the output to sampling data Db which is digital data, and supplies the converted sampling data Db to the processor 30. Specifically, the A/D converter 24 alternately supplies sampling data Db1 obtained by sampling the beat signal B1 and sampling data Db2 obtained by sampling the beat signal B2 to the processor 30. The sampling data Db1 and Db2 are collectively called sampling data Db. Thus, the millimeter-wave radar 100 alternately transmits the transmitted waves Tw1 and the transmitted waves Tw2 for every fixed period, and then alternately acquires the sampling data Db1 and the sampling data Db2.

The processor 30 includes a microcomputer including a CPU, ROM, RAM, I/O unit, and the like, and an arithmetic processing unit that performs signal process, such as FFT, on data taken in via the A/D converter 24. Each function of the processor 30 is realized by the CPU executing a program stored in a non-transitory tangible computer readable medium. In this example, the ROM corresponds to the non-transitory tangible computer readable medium storing the program. By execution of this program, a method corresponding to the program is performed. FFT is an abbreviation of Fast Fourier Transform.

The processor 30 performs analysis process, direction estimation process, received waveform forming process, and distance calculation process, by the CPU executing a program. The method with which the processor 30 performs these process is not limited to software, but the processor 30 may perform a part or all of these process by using hardware combining a logic circuit, an analog circuit, and the like.

(Calculation of Relative Speed and Distance)

The millimeter-wave radar 100 operates as a CW radar. Therefore, the frequency of the beat signal B is a Doppler frequency, and a peak frequency component of the beat signal B corresponds to a relative speed Vr of the target relative to the vehicle 50. As described above, the difference Δf between the frequency f1 and the frequency f2 is sufficiently small compared with the intermediate frequency fc, and thus the Doppler shift fd1 and the Doppler shift fd2 generated by the same target can be regarded as the same. Thus, as fd1≈fd2 (fd1 approximately equal to fd2) and f1≈f2 (f1 approximately equal to f2), the relative speed Vr is expressed by the following formula (1). C refers to the speed of light.

(Math. 1)

$$Vr = \frac{f_d1 \cdot c}{2f1} = \frac{f_d2 \cdot c}{2f2} \quad (1)$$

Figure 3:
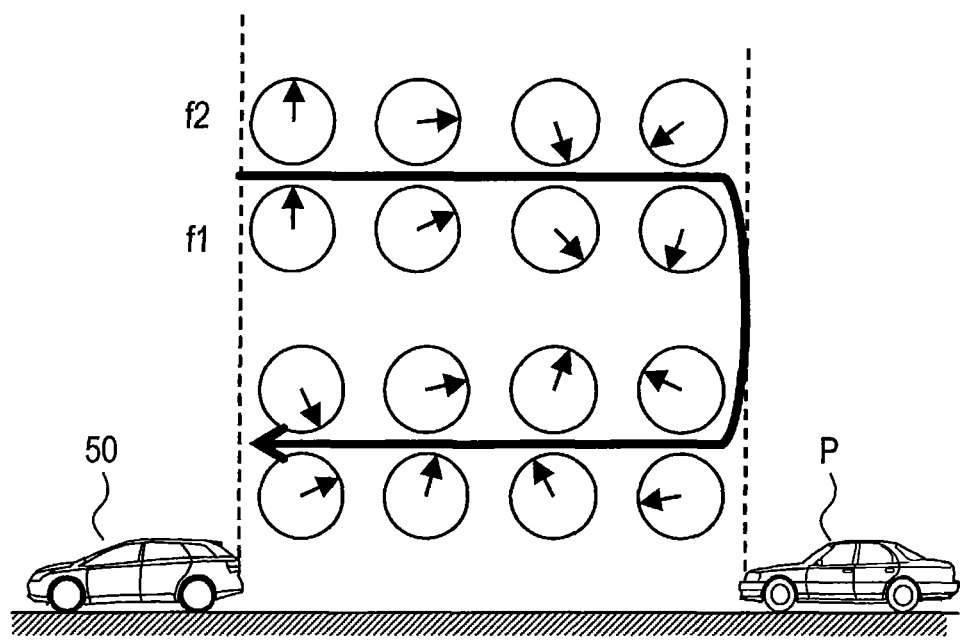
FIG. 3 is a diagram showing variation of phase from transmission to reception for two transmission frequencies.

In FIG. 3, arrows in circles shows the phase of the beat signal B.

As shown in FIG. 3, the phase of the beat signal includes distance information because the phase of the beat signal B varies according to a propagation delay time of electromagnetic waves. Variations Δθ of the phase for the period when the waves are transmitted to when the waves are received are the difference between phases of the transmitted waves Tw1 and the received waves Rw1, and the difference between phases of the transmitted waves Tw2 and the received waves Rw2. Thus, they are phases of the beat signal B1 and the beat signal B2, respectively. In FIG. 3, the phase of the transmitted waves Tw1 coincides with that of the transmitted waves Tw2 at the time of transmission. However, what is required is the variations Δθ of the phase, and thus the phases of the transmitted waves Tw1 and Tw2 at the time of transmission may be different.

Figure 4:
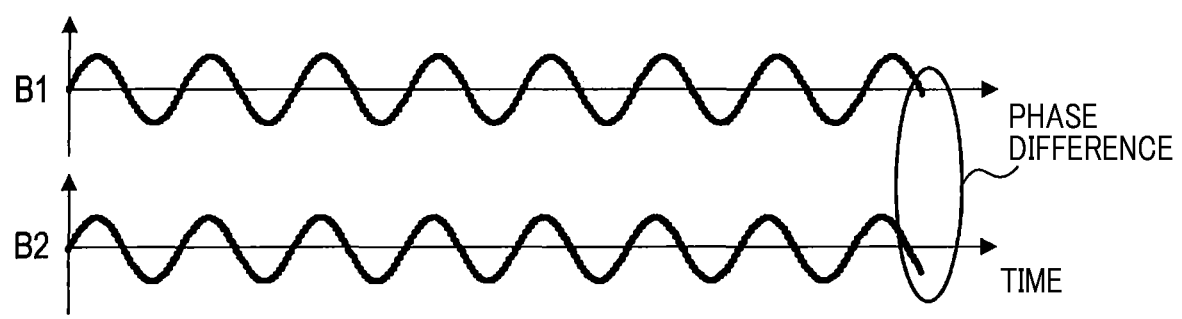
FIG. 4 is a time chart showing beat signals corresponding to two transmission frequencies.
Figure 5:
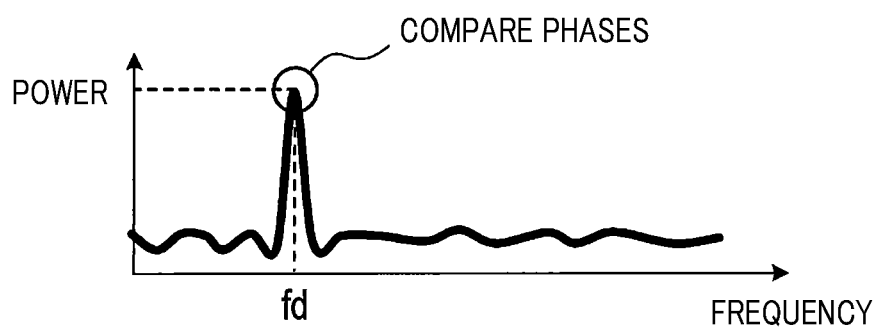
FIG. 5 is a diagram showing a frequency spectrum of a beat signal.

FIG. 4 shows the time chart of the beat signals B1 and B2 corresponding to FIG. 3. Since the variations Δθ of the phase are different depending on the frequencies f1 and f2 of when they are transmitted, a phase difference Δφ occurs between the phase of the beat signal B1 and the phase of the beat signal B2. A relation represented by the formula (2) holds between the phase difference Δφ and the distance R. Hence, when the phase difference Δφ is extracted, the distance R can be calculated. As shown in FIG. 5, the phase difference Δφ may be calculated by detecting phases corresponding to peak frequency components of a power spectrum Spa1 of the beat signal B1 and a power spectrum Spb of the beat signal B2, and by obtaining the difference between the phases. However, if the phase difference Δφ is 2π (or more, so-called folding back occurs, and thus ambiguity occurs in the distance R.

(Math. 2)

$$R = \frac{c \cdot \Delta\varphi}{4\pi(f2 - f1)} \quad (2)$$

(Target Detection Process)

Figure 6:
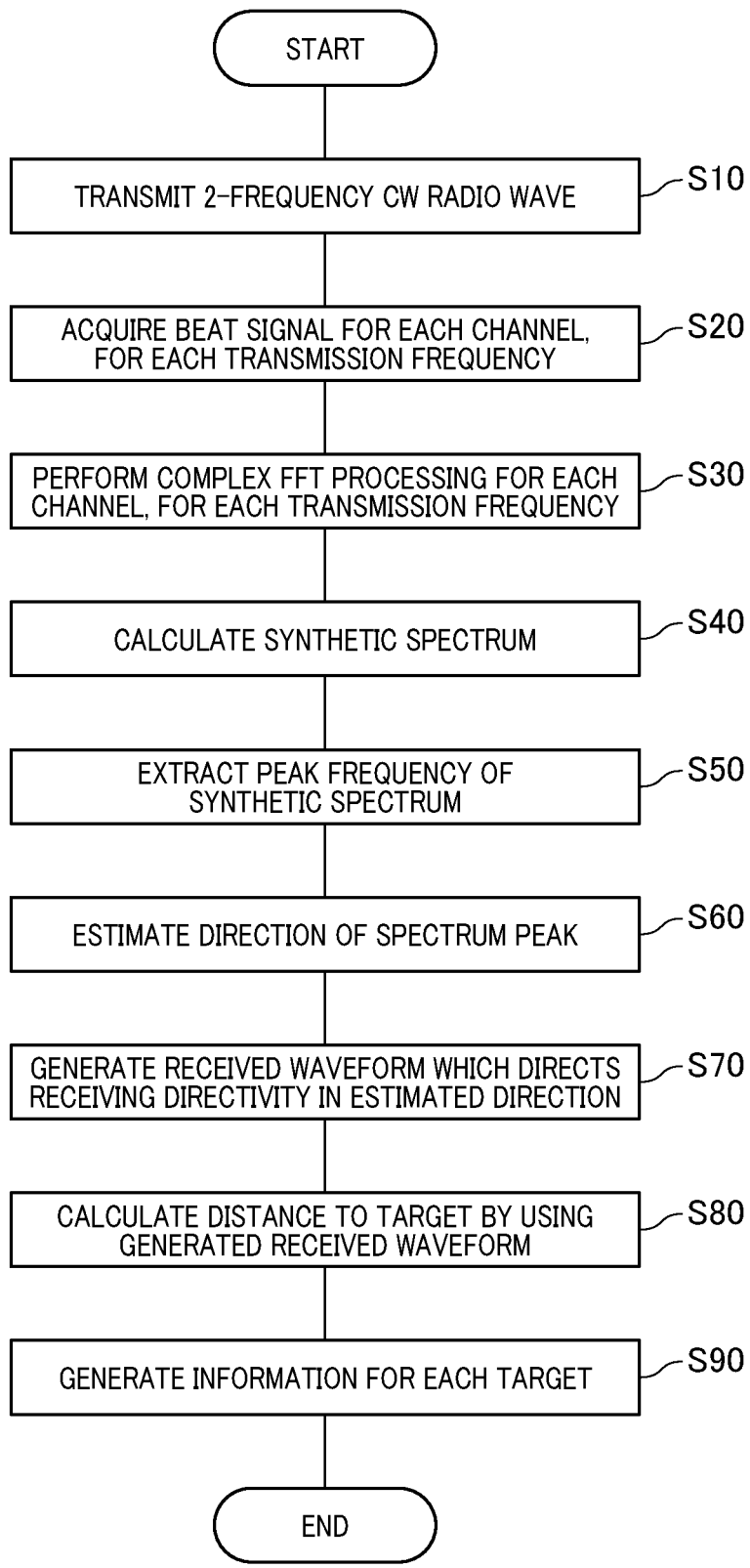
FIG. 6 is a flowchart showing a procedure for a target detection process.

With reference to a flowchart of FIG. 6, target detection process performed by the processor 30 will be described.

At step S10, the processor 30 sequentially transmits radar waves (transmitted waves) of frequency f1 and radar waves (transmitted waves) of frequency f2 for a fixed period of time. At step S20, the processor 30 then acquires sampling data Db of the beat signal B for each channel and for each transmission frequency. That is, the processor 30 acquires sampling data Db1 obtained by respectively sampling N beat signals B1 generated for respective channels ch1 to chN and sampling data Db2 obtained by respectively sampling similarly generated N beat signals B2.

At step S40, the processor 30 performs complex FFT process on the sampling data Db for each channel and for each transmission frequency. That is, the processor 30 performs the complex FFT process for each of the sampling data Db1 and Db2 for each channel to calculate N power spectra Spa1 and N power spectra Spa2.

At step S50, the processor 30 then adds power spectra of all channels and that of all transmission frequencies to calculate a synthetic spectrum Spb. That is, all of the N power spectra Spa1 and all of the N power spectra Spa2 are added to calculate the synthetic spectrum Spb.

At step S50, the processor 30 then extracts a frequency bin from the synthetic spectrum Spb, the frequency bin enabling detection of a peak value of spectrum power, which is not less than the predetermined threshold. That is, the peak frequency component corresponding to the relative speed of the target is extracted. Thus, the relative speed of the target relative to the vehicle 50 is detected. At this time, if a plurality of targets having different relative speeds are present around the vehicle 50, a plurality of frequency bins are extracted, and accordingly a plurality of relative speeds are detected. In the present embodiment, steps S30 to S50 correspond to the process performed by the function of the analysis section.

Figure 8:
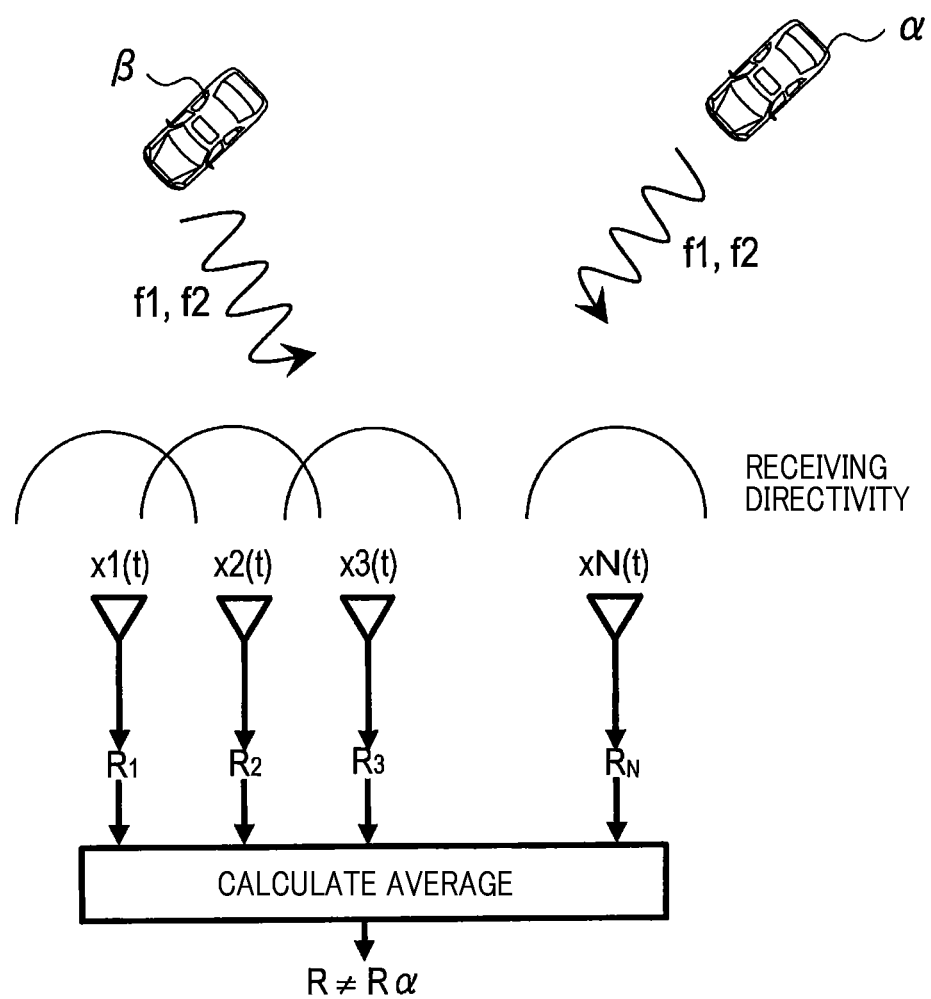
FIG. 8 is a diagram showing flat receiving directivity.

If the relative speeds of the plurality of targets present around the vehicle 50 are all different, the distance R from the vehicle 50 to each target can be calculated respectively, from the phase difference Δφ between the phase of the beat signal B1 and the phase of the beat signal B2, both of which corresponds to each extracted frequency bin. For example, as shown in FIG. 8, the distance R can be calculated by calculating distances R1 to RN for each channel from the phase difference Δφ extracted from the power spectra Spa1 and Spa2 of each channel, and by averaging the distances R1 to RN. That is, in this case, the distance R can be calculated by setting the directivity of the receiving antenna section 20 to flat receiving directivity in which each channel has the same weight. x1(t) to xN(t) represent the beat signal B generated at the channels ch1 to chN, respectively.

However, as shown in FIG. 7, if both a target α and a target β, which are present around the vehicle 50 have the same relative speed Vr, a peak frequency component corresponding to reflected waves from the target α and a peak frequency component corresponding to reflected waves from the target β appear in the same frequency bin in the synthetic spectrum Spb, and cannot be separated from each other. Therefore, in the flat receiving directivity as described above, the calculated distance R is different from both of the distance Rα to the target α, and the distance Rβ to the target β, if the distance R is calculated from the phase difference Δφ corresponding to the extracted frequency bin. In an actual road environment, there are many situations where a plurality of targets having the same relative speed Vr are present around the vehicle 50, and therefore there is a strong desire to calculate the distance to a target with high accuracy even in such a situation.

Figure 9:
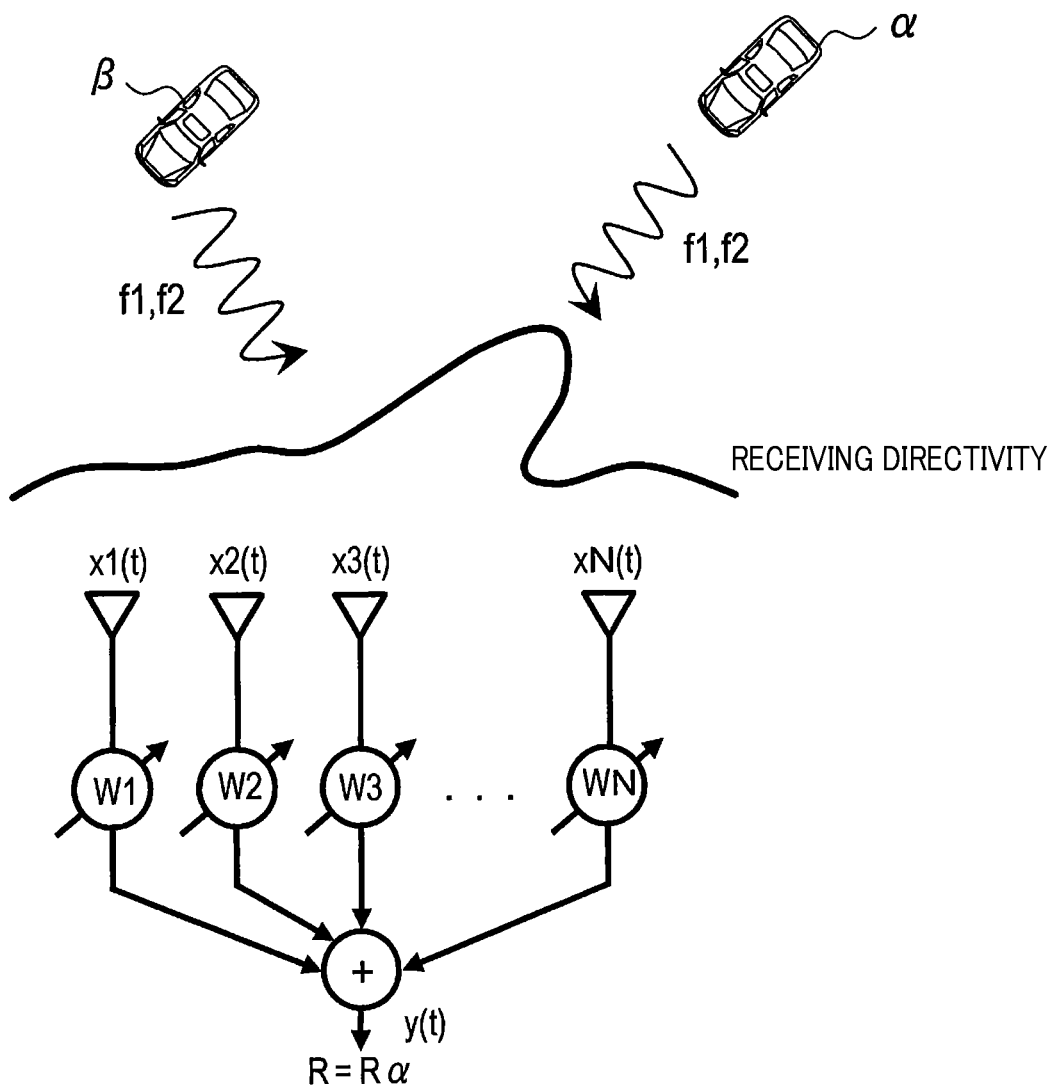
FIG. 9 is a diagram showing receiving directivity having a directivity peak directed to a specific direction.

This is why the directivity of the receiving antenna section 20 is not made flat but the peak of the directivity is directed in a specific direction. Specifically, as shown in FIG. 9, when the distance Rα is calculated, the receiving directivity having the peak of the directivity directed only to the target α is formed by using a signal process approach. That is, the reflected signal from the target β is removed, and only the reflected signal from the target α is extracted. If the received waveform which extracts only the reflected signal from the target α is formed, the phase difference Δφ corresponding to the distance Rα can be extracted with high accuracy from the spectrum of the received waveform. Eventually, the distance Rα is calculated with high accuracy. W1 to WN represent complex weights of the channels ch1 to chN, respectively. y(t) is an output obtained by multiplying beat signals x1(t) to xN(t) by the complex weights W1 to WN, respectively, and adding the resultant signals, that is, y(t) is the received waveform formed when the peak of the directivity of the receiving antenna section 20 is directed in the specific direction. In the following, W1 to WN are referred to as W.

To form the received waveform in which the peak of the directivity of the receiving antenna section 20 is directed to the target that is a calculation object of the distance, the direction in which the target is present relative to the vehicle 50 is required. Thus, step S60 estimates an arrival direction of a reflected wave from the vehicle 50 for each peak frequency component in the synthetic spectrum Spb, that is, for each frequency bin in which presence of the target was recognized. The estimation method of the arrival direction may be any method.

For example, the arrival direction may be estimated by using algorithm, such as DBF, which estimates the arrival direction by scanning a main lobe of the receiving antenna section 20. In addition, the arrival direction may be estimated by using a high-resolution arrival direction estimation algorithm, such as MUSIC or ESPRIT, which estimates the arrival direction with high resolution by scanning a null of the receiving antenna section 20. The arrival direction may be estimated by using the beat signal B1 corresponding to the frequency f1, or the arrival direction may be estimated by using the beat signal B2 corresponding to the frequency f2. In the present embodiment, step S60 corresponds to the process performed by the function of the direction estimating section.

Figure 10:
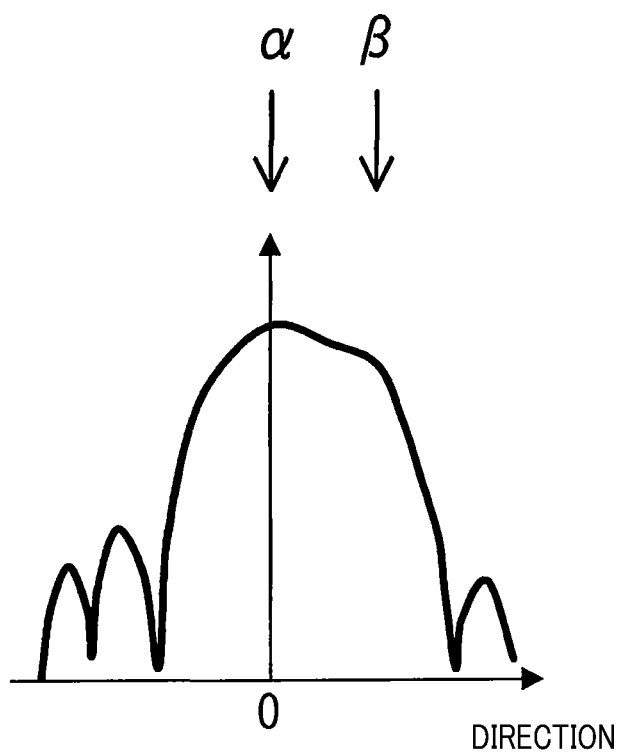
FIG. 10 is a diagram showing estimation of an arrival direction of a spectral peak, using DBF.
Figure 11:
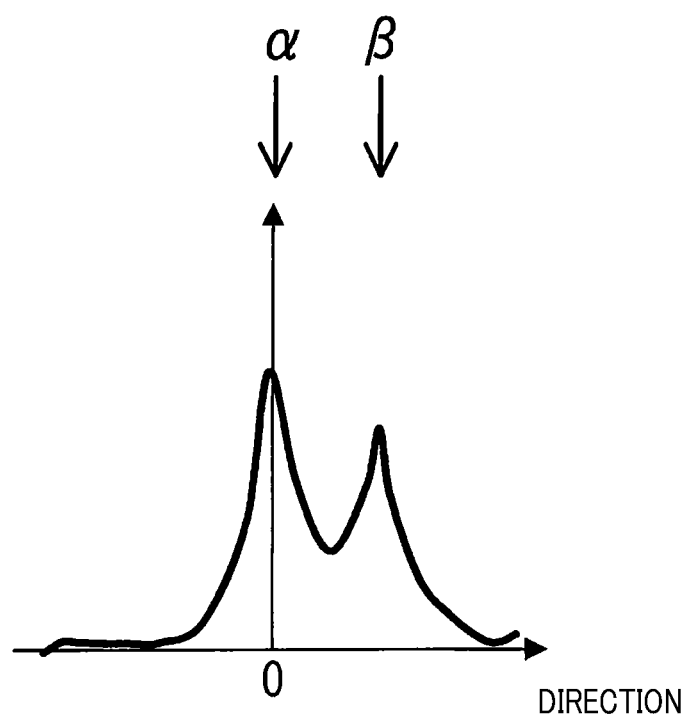
FIG. 11 is a diagram showing estimation of an arrival direction of a spectral peak, using MUSIC.

If the target $\alpha$ and the target $\beta$ are present close to each other, and if an arrival direction is estimated by using DBF as shown in FIG. 10, the arrival direction may be estimated with the target $\alpha$ and the target $\beta$ as an integrated target. On the other hand, as shown in FIG. 11, if the arrival direction is estimated by using MUSIC, each of the arrival directions of the target $\alpha$ and the target $\beta$, which are present close to each other, can be estimated separately. Therefore, the arrival direction is desirably estimated by using a high-resolution arrival direction estimation algorithm, but because the calculation load becomes correspondingly high, an algorithm may be selected according to performance or the like of the processor 30. DBF is an abbreviation of Digital Beam Forming, and MUSIC is an abbreviation of Multiple Signal Classification. ESPRIT is an abbreviation of Estimation of Signal Parameters via Rotational Invariance Techniques.

At step S70, the processor 30 then calculates complex weights W of the channels ch1 to chN so as to direct the peak of the directivity of the receiving antenna section 20 in the estimated direction for each of the estimated directions that is the estimated arrival directions. Then, the beat signals B1 generated in each channel are multiplied by the calculated complex weights W, respectively, and the resultant signals are added. Similarly, the beat signals B2 generated in each channel are multiplied by the complex weights W, respectively, and the resultant signals are added. At this time, regardless of the transmission frequencies, the complex weight for the same channel may be the same. Thus, the received waveform of when the peaks of the directivity of the antenna section 20 are directed in the estimated directions, is formed by using the beat signals B which is generated for the respective channels for each transmission frequency.

The calculation method of complex weight W may be any method. For example, complex weights W that form simple DBF directivity may be calculated. Complex weights W may be calculated by using DCMP. In the complex weights W, receiving directivity is formed as directing the peak of the directivity in the direction of the specific target, and as directing the null directivity to the other targets. DCMP is an abbreviation of Directionally Constrained Minimization of Power. In the present embodiment, step S70 corresponds to the process performed by the function of the received waveform forming section.

Figure 12:
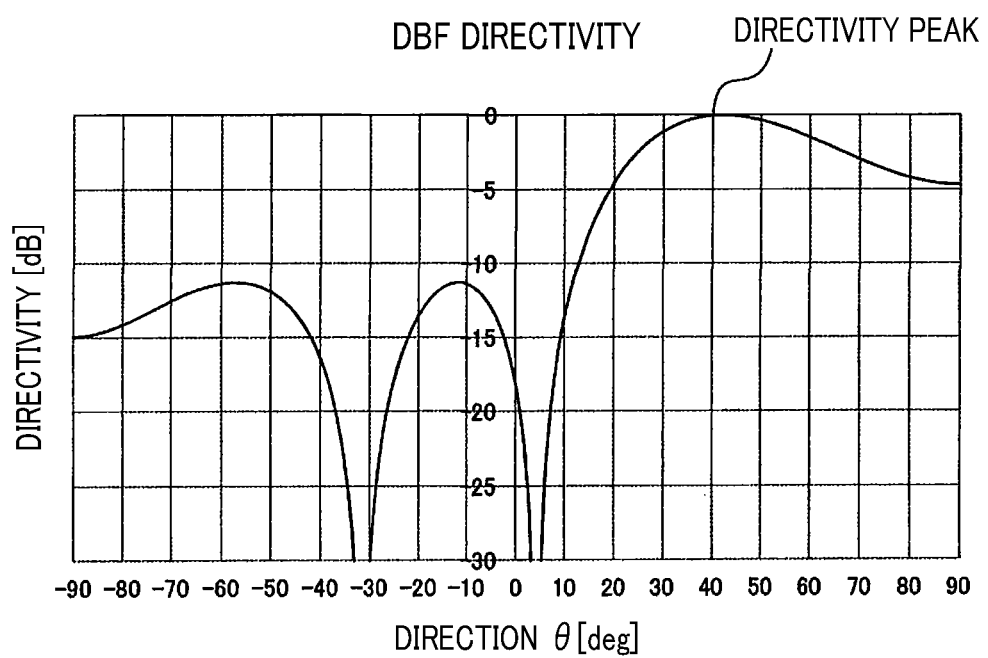
FIG. 12 is a graph showing receiving directivity formed by using DBF.
Figure 13:
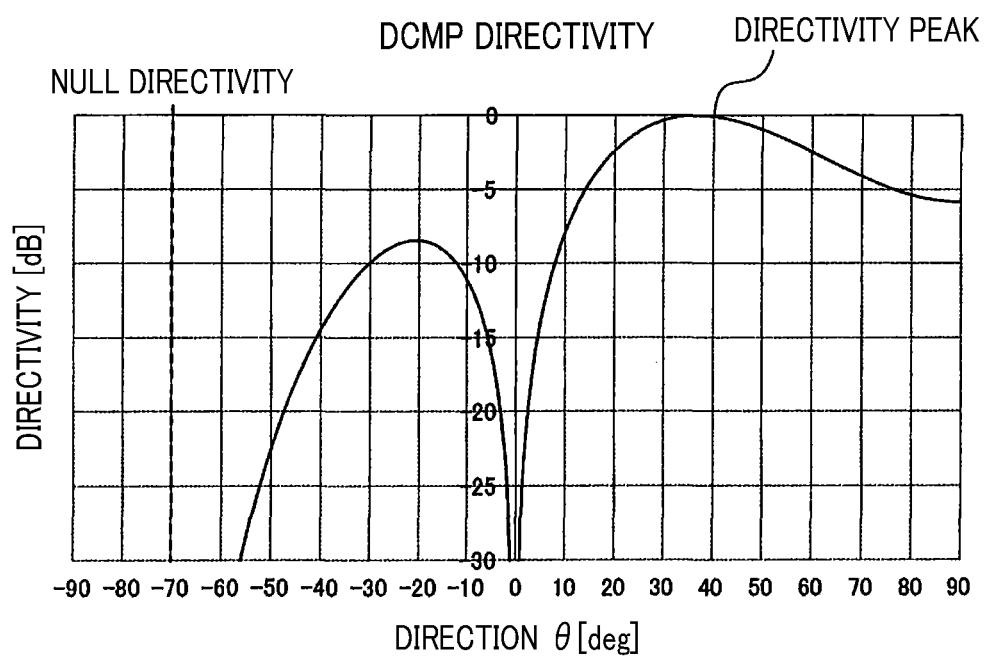
FIG. 13 is a graph showing receiving directivity formed by using DCMP.

Each of FIGS. 12 and 13 shows receiving directivity formed with the target $\alpha$ as a calculation object of distance, if the target $\alpha$ is present in a 40 deg direction and the target $\beta$ is present in a −70 deg direction. FIG. 12 shows DBF directivity with the peak of the directivity directed in the 40 deg direction. FIG. 13 shows DCMP directivity with the peak of the directivity directed in the 40 deg direction and the null directivity directed in the −70 deg direction. The received waveform formed using DBF includes not only the reflected wave from the target $\alpha$ but also the reflected wave from the target $\beta$. However, the reflected wave from the target $\beta$ is removed from the received waveform formed using DCMP. Therefore, by using DCMP, the distance is calculated with higher accuracy.

Thus, to calculate the distance with high accuracy, it is most desirable to estimate the arrival direction by using the high-resolution arrival direction estimation algorithm, and form a received waveform by using DCMP. However, because the calculation load becomes correspondingly high, the arrival direction may be estimated by DBF and the received waveform may be formed by using DCMP, or the arrival direction may be estimated by the high-resolution arrival direction estimation algorithm and the received waveform may be formed by DBF.

At step S80, the processor 30 then calculates the distance R to the target by using the received waveform which is formed for each estimated direction. That is, the processor 30 performs the FFT process for each of the received waveforms formed for each transmission frequency to extract the phase difference $\Delta\varphi$. Then, by using the extracted phase difference $\Delta\varphi$, the distance R is calculated. By the process so far, relative speed, direction, and distance can be obtained for each target. In the present embodiment, step S80 corresponds to the process performed by the function of the distance calculating section.

At step S90, the processor 30 generates target information including the relative speed, direction, and distance, for each target. Then, the present process is terminated.

(Effects)

According to the present embodiment described above in detail, the following effects can be obtained.

(1) Depending on speed relative to the target, the direction of the target having the relative speed is estimated. Then, for each transmission frequency, a received waveform is produced for the case where the directivity of the antenna section 20 is directed in one of the estimated directions. Hence, with high accuracy, the processor 30 can extract the phase difference $\Delta\varphi$ corresponding to the distance to the target which is present in the direction the directivity is directed, even if a plurality of targets having the same relative speed are present around the vehicle 50. Therefore, even if a plurality of targets having the same relative speed are present around the vehicle 50, the distance R to each target is calculated with high accuracy.

(2) By forming the received waveform using DCMP, the received waves are formed, such waves only extract the reflected waves from the target, that is, the object of calculation for distance. Hence, the distance to the target, that is, to the object of calculation for distance, can be calculated with high accuracy.

(3) By combining the high-resolution arrival direction estimation algorithm and DCMP, the distance to the target, that is, to the calculation object can be calculated with higher accuracy.

OTHER EMBODIMENTS

The embodiment of the present disclosure has been described above, but the present disclosure is not limited to the above-described embodiment and can be carried out in various modes.

(a) In the above embodiment, the millimeter-wave radar 100 is operated as the 2-frequency CW radar, but is not limited to this. The millimeter-wave radar 100 may operate as a multi-frequency CW of 3 or more frequencies.

(b) In the above embodiment, the relative speed is detected from the synthetic spectrum Spb, but the relative speed may be detected from any of the power spectra Spa1 and Spa2, or average power spectrum.

(c) A plurality of functions of one constituent element in the above embodiment may be provided by a plurality of constituent components, or one function of one component may be provided by a plurality of components. A plurality of functions of a plurality of components may be provided by one component, or one function realized by a plurality of components may be provided by one component. Furthermore, part of a configuration of the above embodiment may be omitted. At least part of a configuration of the above embodiment may be added to or replaced with another configuration of the above embodiment. The embodiments of the present disclosure include any mode included in the technical spirit specified by the language of the claims.

(d) Other than the above-described target detection device, the present disclosure can also be realized in various embodiments, such as a system using the target detection device as a constituent element, a program for causing a computer to function as the target detection device, a non-transitory tangible computer readable medium such as a semiconductor memory storing the program, and a target detection method.

The invention claimed is:

1. A target detection device configured to detect a target around a vehicle, the target detection device comprising:
an analysis section configured to frequency-analyze each of beat signals generated from a plurality of continuous-wave signals having different frequencies sequentially transmitted by an on-vehicle radar having a plurality of receiving antennas and received waves which are continuous waves reflected by the target and received by each of the plurality of receiving antennas, for each of the frequencies of the continuous waves and for each of the plurality of receiving antennas;
a direction estimating section configured to estimate arrival directions of reflected waves by using the beat signals, for each frequency bin in which a presence of the target is recognized by frequency analysis in the analysis section;
a received waveform forming section configured to form a received waveform for each of the frequencies of the continuous waves by weighting the beat signals used for estimating the arrival directions of the reflected waves, so as to have a directivity of the plurality of receiving antennas in one of the arrival directions estimated by the direction estimating section; and
a distance calculating section configured to calculate a distance to the target from a phase difference between received waveforms formed by the received waveform forming section for each of the frequencies of the continuous waves, wherein:
the received waveform forming section is configured to form the received waveform to comprise receiving directivity; and
the receiving directivity is formed by calculating weights of the beat signals so as to
direct a peak of the directivity in a direction where a first target as a calculation object of the distance is present, and
direct a null of the directivity in a direction where a second target as a non-calculation object of the distance is present, of the arrival directions estimated by the direction estimating section.

2. The target detection device according to claim 1, wherein:
the direction estimating section is configured to estimate the arrival directions by using a high-resolution arrival direction estimation algorithm.

3. The target detection device according to claim 1, wherein:
the received waveform forming section is configured to calculate the weights of the beat signals by using a method of Directionally Constrained Minimization of Power.

4. The target detection device according to claim 1, wherein:
the direction estimating section is configured to select an algorithm for estimating the arrival directions depending on performance of a processor which performs a process for estimating the arrival directions of the reflected waves.

5. A computer-implemented method for detecting a target around a vehicle, the vehicle equipped with on-vehicle radar having a plurality of receiving antennas, the computer-implemented method comprising:
frequency-analyzing each of beat signals generated from a plurality of continuous-wave signals having different frequencies sequentially transmitted by the plurality of receiving antennas and received waves which are continuous waves reflected by the target and received by each of the plurality of receiving antennas, for each of the frequencies of the continuous waves and for each of the plurality of receiving antennas;
estimate arrival directions of reflected waves by using the beat signals, for each frequency bin in which a presence of the target is recognized by frequency-analyzing each of the beat signals;
forming a received waveform for each of the frequencies of the continuous waves by weighting the beat signals used for estimating the arrival directions of the reflected waves, so as to have a directivity of the plurality of receiving antennas in one of the arrival directions; and
calculating a distance to the target from a phase difference between received waveforms formed for each of the frequencies of the continuous waves, wherein:
the received waveform is formed to comprise receiving directivity, the receiving directivity is formed by calculating weights of the beat signals so as to
direct a peak of the directivity in a direction where a first target, as a calculation object of the distance, is present, and
direct a null of the directivity in a direction where a second target, as a non-calculation object of the distance, is present.

* * * * *